(12) United States Patent
Moquin et al.

(10) Patent No.: US 6,789,485 B2
(45) Date of Patent: Sep. 14, 2004

(54) GAS GENERATOR AND METHOD OF ASSEMBLY

(75) Inventors: Larry A. Moquin, Rochester Hills, MI (US); Bruce A. Stevens, Oakland, MI (US); Steven M. Dunham, Mt. Clemens, MI (US); Jeffery S. Blackburn, Lake Orion, MI (US); Sean P. Burns, Almont, MI (US); Graylon K. Williams, Warren, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 112 days.

(21) Appl. No.: 09/996,170

(22) Filed: Nov. 28, 2001

(65) Prior Publication Data

US 2002/0079680 A1 Jun. 27, 2002

Related U.S. Application Data

(60) Provisional application No. 60/253,516, filed on Nov. 28, 2000.

(51) Int. Cl.[7] .............................................. C06D 5/06
(52) U.S. Cl. ..................... 102/530; 280/741; 264/3.1; 86/1.1; 86/20.12
(58) Field of Search ...................... 149/19.2; 280/736, 280/741; 102/289, 530; 264/3.1; 86/1.1, 20.12

(56) References Cited

U.S. PATENT DOCUMENTS

| 2,921,521 | A |   | 1/1960  | La Haye et al. ............... 102/39 |
| 3,255,281 | A |   | 6/1966  | Alexander ....................... 264/3 |
| 3,722,354 | A |   | 3/1973  | Herty, III ......................... 86/1 |
| 3,724,870 | A |   | 4/1973  | Kurokawa et al. ........... 280/150 |
| 3,986,908 | A |   | 10/1976 | Grebert et al. ............. 149/19.7 |
| 4,099,376 | A |   | 7/1978  | Japs ............................ 60/253 |
| 4,131,051 | A |   | 12/1978 | Schaffling ..................... 86/1 R |
| 4,944,528 | A |   | 7/1990  | Nilsson et al. ............... 280/741 |
| 5,562,303 | A |   | 10/1996 | Schleicher et al. .......... 280/736 |
| 5,623,115 | A |   | 4/1997  | Lauritzen et al. ............ 102/288 |
| 5,738,374 | A |   | 4/1998  | Marsaud et al. ............. 280/741 |
| 5,804,758 | A |   | 9/1998  | Marsaud et al. ............. 102/288 |
| 6,029,994 | A |   | 2/2000  | Perotto et al. .............. 280/736 |
| 6,517,647 | B1 | * | 2/2003  | Yamato ........................ 149/45 |

* cited by examiner

Primary Examiner—Michael J. Carone
Assistant Examiner—Aileen B. Felton
(74) Attorney, Agent, or Firm—Dinnin & Dunn, P.C.

(57) ABSTRACT

Assembly of a gas generator 10 includes the step of adding uncured silicone to a propellant cup 25. Granulated oxidizer is then added over the top of the silicone and allowed to disperse therein. Afterwards, the silicone is cured to provide flush communication with an inner wall 14 of the propellant cup 25. Other granulated gas generant constituents may be added as well. A gas generator 10 assembled in this manner provides more predictable burn rates of a gas generant composition 26 and therefore more predictable performance of the gas generator 10.

16 Claims, 3 Drawing Sheets

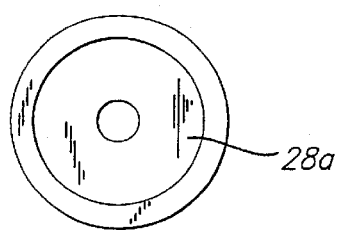
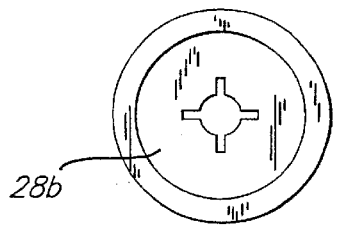
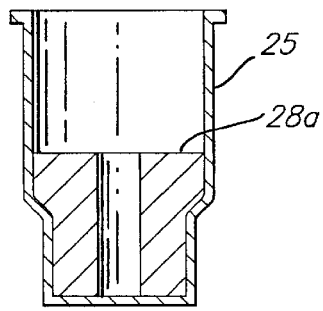
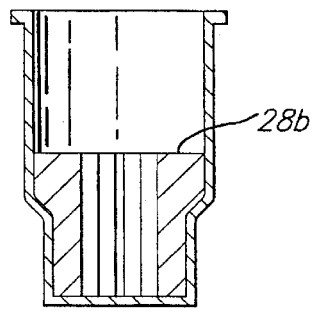
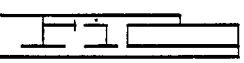
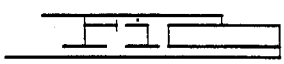
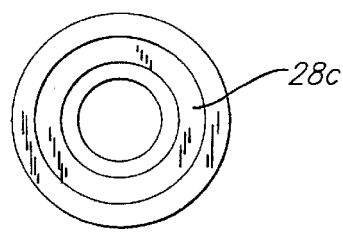
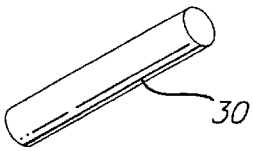
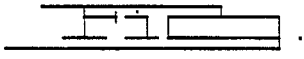
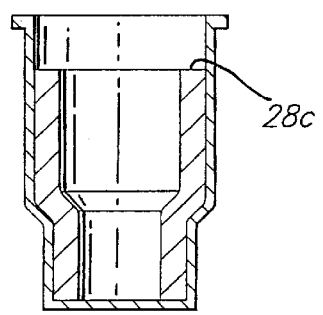
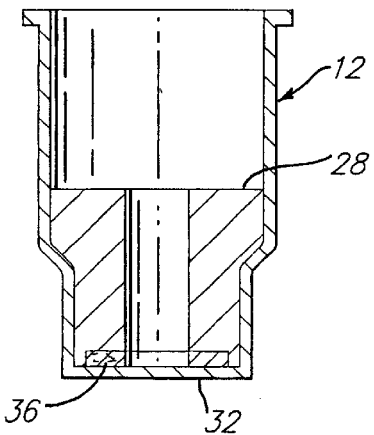
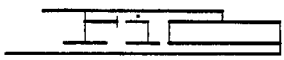

US 6,789,485 B2

GAS GENERATOR AND METHOD OF ASSEMBLY

CROSS-REFERENCE TO RELATED APPLICATION(S)

The present application claims the benefit of U.S. Provisional Application Serial No. 60/253,516 filed on Nov. 28, 2000.

FIELD OF THE INVENTION

In general, the present invention relates to a gas generator employed in a vehicle occupant protection system. As such, a preferred use of the present invention relates to a gas generator that may be typically used to activate a seatbelt pretensioner, for example.

BACKGROUND

Gas generators used in seatbelt pretensioners are known as micro gas generators given the relatively smaller size of the gas generator. Exemplary pretensioners include those described in U.S. Pat. Nos. 5,397,075 and 5,899,399, herein incorporated by reference.

Micro gas generators generally contain an initiator, an initiator retainer, a propellant cup, and a propellant contained within the propellant cup. In many micro gas generators, the propellant is provided in tablet form wherein the aggregate combustion surface area is substantially higher than in gas generants provided in monolithic gas generating casts, for example.

The total surface area of the propellant in any gas generator is often optimized based on the burning rate of the respective gas generant composition. Historically, many azide-based compositions have been satisfactorily provided in tablet form given the relatively low burn rate of many azide-based compositions. With the advent of non-azide compositions, however, relatively higher burn rates often require a relatively lower aggregate propellant surface area. Therefore, monolithic casts can be formed that effectively reduce the total propellant surface area exposed to combustion.

Some pretensioner designs may benefit from a relatively quick gas dump or production. However, most designs benefit from a relatively steady gas delivery such as produced by neutral burning surface shapes like perforated cylindrical propellant grains. An example is a typical state of the art micro gas generator (MGG) containing a non-azide fuel such as nitrocellulose, which produces the tank curve shown in FIG. 6. One disadvantage with the use of nitrocellulose is the excessive carbon monoxide produced upon combustion. Alternative propellant compositions improve upon the effluent and stability requirements, but have relatively high burn rates that pragmatically inhibit the use of small granules, small tablets, or small grain size.

Another problem with the use of granulated or small extruded propellant grains such as tablets is the potential release of the pyrotechnic material into the pretensioner once combustion begins. This may lead to the release of burning propellant from the pretensioner or burning of the pretensioner components. Retention of the propellant within the propellant cup during combustion would prevent these potential drawbacks.

When forming a monolithic propellant cast, the shape of the cast must be closely equivalent to the propellant cup. The failure to closely conform the outer surface of the propellant cast to the interior surface of the propellant cup detrimentally affects the predetermination of the total combustion surface area. Stated another way, any portion of the exterior surface of the cast that is not flush against the interior surface of the propellant cup presents additional surface area and thereby skews the combustion profile of the gas generator. As a result, predictable performance of the gas generator and/or the pretensioner becomes less probable.

Additionally, it is well recognized that the monolithic cast must have a well-mixed and homogeneous consistency throughout the cast. Failure to adequately mix the various gas generant constituents into a homogeneous mixture may result in incomplete combustion and/or inconsistent combustion profiles relative to operation of a seatbelt pretensioner, for example. In essence, an incomplete mix results in a heterogeneous mix of the fuel and oxidizer thereby resulting in incomplete combustion systems in certain regions of the solid propellant. One related concern is that well-mixed homogeneous compositions require more labor intensive or more complicated processes. In general, as the manufacturing process becomes more complicated, the production costs become substantially greater.

SUMMARY OF THE INVENTION

A gas generator containing a monolithic propellant cast solves the above-referenced problems. In accordance with the present invention, preferred gas generant constituents are combined within the propellant cup, wherein ammonium perchlorate or any other oxidizer is simply added to uncured silicone. Uncured curable silicone is first added to a propellant cup on the assembly line at about 15–30%% by weight of the total gas generant composition. Ammonium perchlorate is then added to the uncured silicone at 70–85% by weight of the gas generant composition. A preferred composition contains 27% by weight of silicone and 73% by weight of ammonium perchlorate. The present inventors have unexpectedly discovered that simply adding a granulated oxidizer to uncured silicone results in a homogeneous dispersion of the oxidizer throughout the silicone. On average, the oxidizer is homogeneously suspended within the silicone within one to two hours depending on the resin employed.

It is believed that the uncured silicone possesses dispersant properties as it cures, and thus facilitates the homogeneous dispersion of the ammonium perchlorate, or any other gas generant constituent known to be used in vehicle occupant protection systems, before the silicone is completely cured. As a result, actual mixing is not required and processing is therefore simplified. Furthermore, as the uncured silicone begins to cure, it adheres to the interior surface of the propellant cup thereby ensuring the outer surface of the cast conforms exactly to the inner surface of the propellant cup in flush communication therewith. Predetermined surface area is thus ensured, minimizing deviation in the average combustion profile. Furthermore, the monolithic cast is better retained within the propellant cup once combustion is initiated.

BRIEF DESCRIPTON OF THE DRAWINGS

Figure 3:
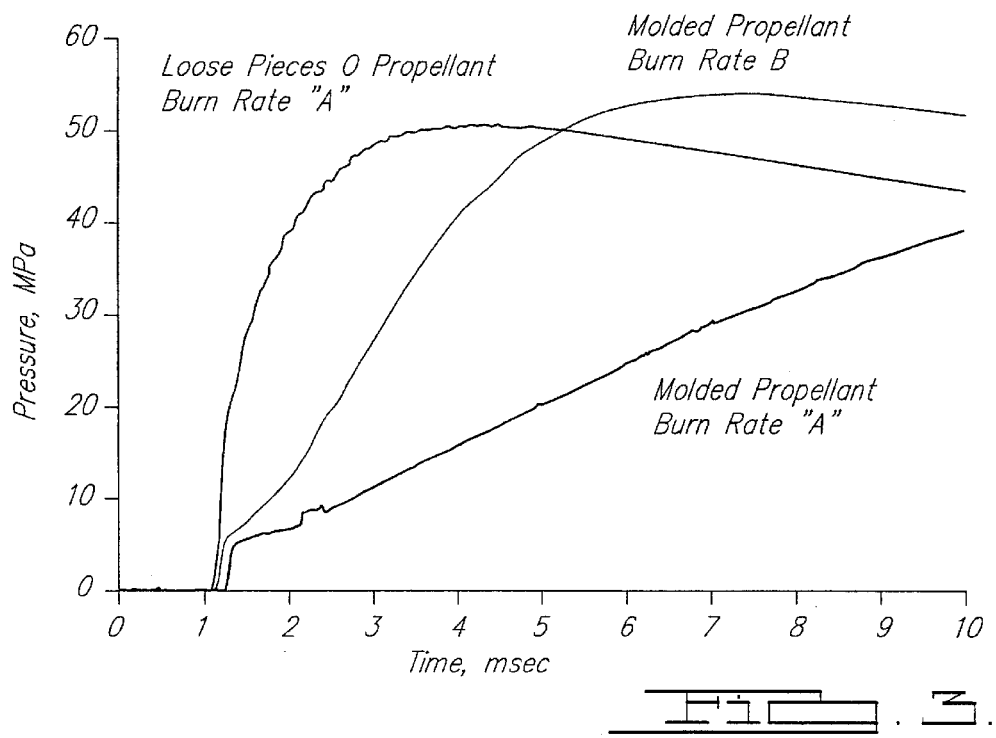

FIG. 3 is a graphical illustration of the relatively higher burn rate of small granules of pyrotechnic material when compared to monolithic casts of propellants having variable surface area. Burn Rate B illustrates a molded cast having a greater combustion surface area whereas Burn Rate A illustrates a molded cast having a lesser combustion surface area. The linear curve of the molded Burn Rate A relative to the nonlinear curve of the "loose piece propellant Burn Rate A" indicates enhanced control with a molded propellant FIG. 4 illustrates a variety of geometric surfaces that result in respective variable burn rates.

Figure 5:
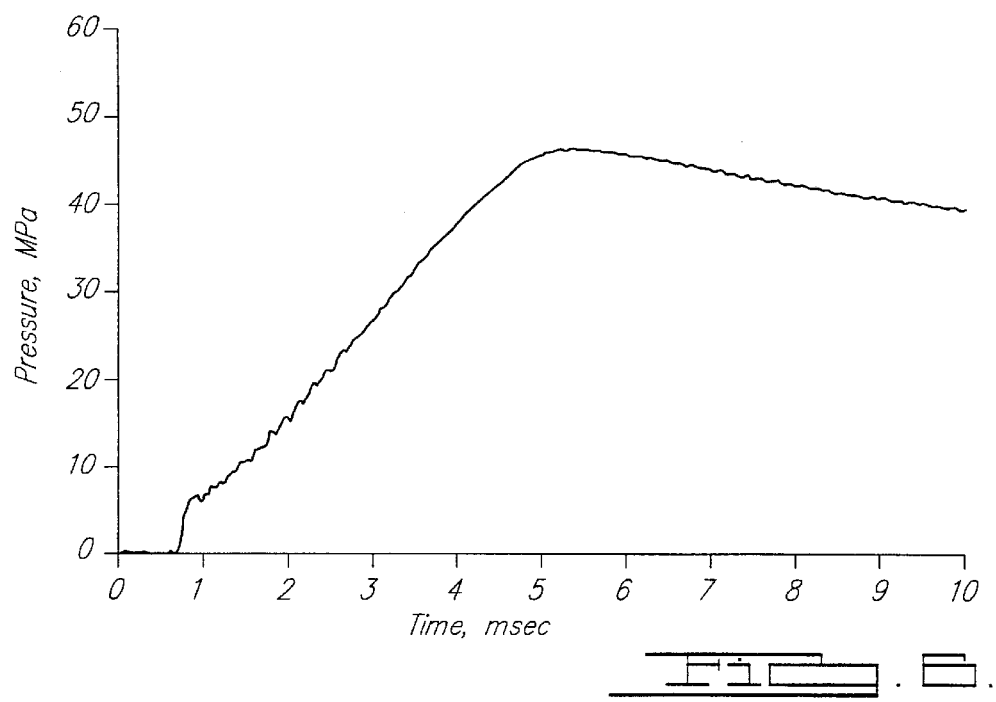

FIG. 5 illustrates a micro gas generator of the present invention including an autoignition material.

FIG. 6 illustrates a pressure over time curve of a typical state of the art micro gas generator containing nitrocellulose.

DETAILED DESCRIPTION OF THE PREFERRED EMBODIMENT OF THE INVENTION

As shown in the figures, a micro gas generator 10 includes a housing 12 having an inner wall 14 and an outer wall 16, and a first end 18 and a second end 20. The housing 12 contains an initiator 22 within the first end 18 for igniting a gas generant composition described below. An initiator retainer 24 is formed within the first end 18 and provides structural support for the initiator 22. A propellant cup 25 is defined by the inner wall 14 within the second end 20. A monolithic propellant grain or monolithic gas generant composition 26 is contained within the propellant cup 25 and ignitably communicates with the initiator 22. The propellant 26 is cast inside the propellant cup 25 (as described below) thereby forming a monolithic grain with a predetermined geometry. The gas generant composition 26 contains silicone, preferably at 15–30% weight percent, and at least one oxidizer at 70–85% by weight.

The surface area 28 of the propellant 26 can be tailored based on the respective burn rate using molding techniques well known in the art. The grain geometry controls the burn surface area and therefore the gas generation and burning rates of the gas generant composition. In one embodiment, the burn surface area is relatively constant during combustion, thereby producing a steady supply of gas. The burn rate may be tailored to accommodate a regressive or progressive burn rate as a function of cup design.

By variation of the propellant burn rate and grain surface area 28, a broad range of gas generation rates can be achieved as shown in FIG. 3. Several molded shapes exhibiting different initial surface areas 28a, 28b, and 28c that in turn produce different gas generation rates are shown in FIG. 4. Insertion of a preform 30 into the propellant cup 25 facilitates the formation of a various surface area shapes.

In accordance with the present invention, gas generant constituents of the present pyrotechnic gas generant compositions include silicone as a fuel/binder at 15–30% by weight of the gas generant composition. A granulated oxidizer, preferably ammonium perchlorate, is provided at 70–85% by weight of the gas generant composition. Alternatively, other oxidizers such as potassium perchlorate may be employed.

When assembling the gas generator 10 described above, uncured curable silicone is first added to the propellant cup or a combustion container 24. Granulated oxidizer, and any other desired gas generant constituent known and accepted for use in vehicle occupant protection systems, is then simply added or sprinkled over the top of the uncured silicone. The uncured silicone then adsorbs the granular solid ingredients during the curing process. Next, the silicone/gas generant constituent(s) combination is cured at ambient temperature, or at elevated temperatures if desired. The cure can be completed in seconds to days or longer if desired. One skilled in the art will appreciate that curing is a function of temperature as well as the type of silicone, resin, and curative inhibitors normally included in off-the-shelf silicones. As the gas generant composition 26 cures, it adheres to the inner wall 14 of the housing 12, thereby establishing flush communication with the wall 14 and ensuring control of the total combustible surface area during combustion of propellant 26.

It will be appreciated that optimizing the particle size of the granulated gas generant constituents relative to the viscosity of a given silicone will vary the mixing rate as desired. Furthermore, the cure time and viscosity can be tailored to accommodate various particle sizes and design ballistic characteristics.

After curing, the resulting solid mass functions as a homogeneously blended cast of pyrotechnic material. It is believed that dispersant properties of the silicone act upon the oxidizer or gas generant constituent to provide uniform mixing thereby resulting in a homogeneous admixture.

Silicone is defined as any of a large group of siloxane polymers based on a structure consisting of alternate silicon and oxygen atoms with various organic radicals (or functional groups) attached to the silicon. Radicals include, but are not limited by the group including methyl, methoxy, and amino. Polydimethylsiloxane (PDMS) is one example.

The term "silicone" as used herein will be understood in its generic sense. Hawley describes silicone (organosiloxane) as any of a large group of siloxane polymers based on a structure consisting of alternate silicon and oxygen atoms with various organic radicals attached to the silicon:

Formula 1: Silicone Example

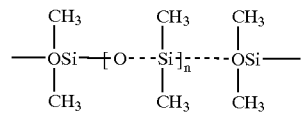

Formula 2: Silicone Example

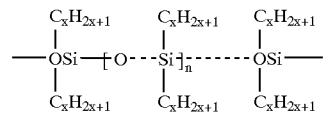

Note, "n" in the Formulas indicates a multiple of the polymeric group or portion of the molecule given within the brackets, to include the organic groups attached to the silicon.

Exemplary silicones include those disclosed in U.S. Pat. Nos. 5,589,662, 5,610,444, and 5,700,532, and, in TECHNOLOGY OF POLYMER COMPOUNDS AND ENERGETIC MATERIALS, Fraunhofer-Institut fur Chemische Technologie (ICT), 1990, each reference and document herein incorporated by reference.

GE RTV615 identifies the proprietary name of a silicone manufactured by General Electric, found to be useful in the present invention. The main constituents in the two-part silicone include vinylpolydimethylsiloxane at about 60–80 wt. % and vinyl-containing resin at about 10–30 wt. %. RTV615 will cure completely at ambient temperature in about 6–7 days (but sufficiently in 24 hours). The application of heat substantially quickens the cure rate so that at 65C the cure rate is about 4 hours and at 150C the cure rate is about 15 minutes. The viscosity of uncured RTV615 at room temperature approximates 4000–7000 centipoise. In general, silicone used in the present invention may have a viscosity of 40–10,000 centipoise if desired, so long as the silicone is flowable or behaves as a fluid in the manufacturing environment.

If an autoignition material (AIM) is required, a piece of preformed autoignition material 36 can be insert molded against the propellant cup wall 14, providing intimate thermal contact with the environment. See FIG. 5. "In situ blending" of the gas generant constituents within the propellant cup 25 obviates the need for a separate mixing or blending step in the manufacture of the gas generant composition. As such, no separate mixing facility or propellant manufacturing facility is required in the manufacturing process. The process thus becomes inherently less expensive, safer, and less time consuming. Furthermore, the shipping requirements of hazardous substances as prescribed by the Department of Transportation (D.O.T.) are substantially relaxed. The gas generant constituents used in the present invention are in and of themselves not determined to be "hazardous" as defined by D.O.T. regulations. In general, the impact sensitivities or friction sensitivities of the gas generant constituents of the present invention simply do not pose a substantial hazard.

The structural elements of the micro gas generator are manufactured by means known in the art. U.S. Pat. Nos. 5,397,075 and 5,899,399, herein incorporated by reference, are instructional and exemplify the use of micro gas generators within seatbelt pretensioners of a vehicle occupant protection system. In general, the present invention is contemplated as having broad application relative to many of the gas generators in the art.

Figure 1:
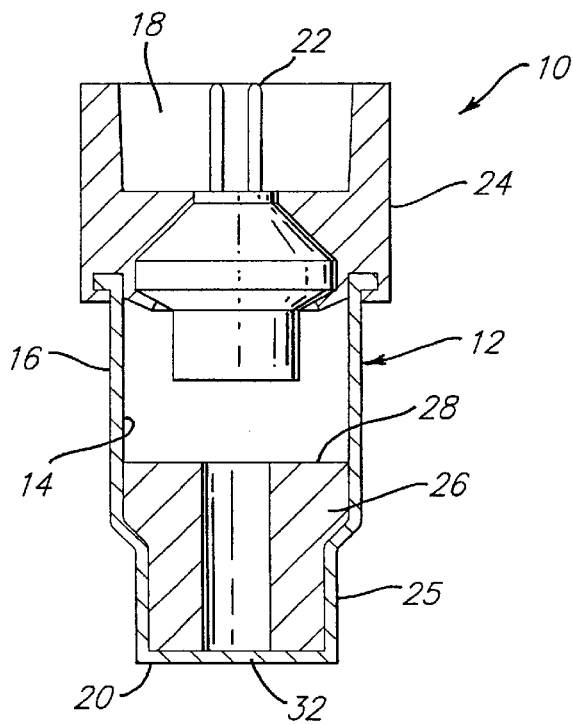
FIG. 1 is a sectional elevation of a micro gas generator in accordance with the present invention.
Figure 2:
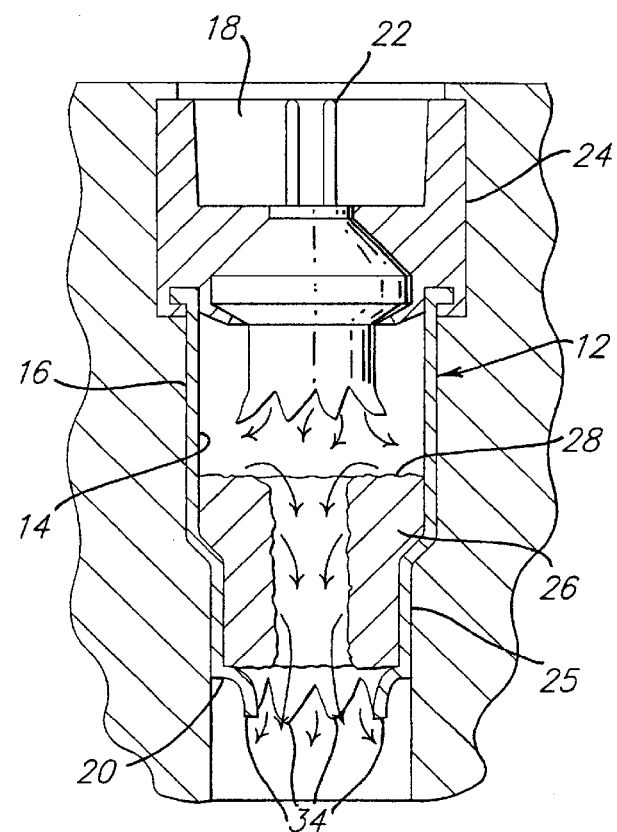
FIG. 2 is a sectional elevation of a micro gas generator of the present invention after propellant combustion initiation.

In operation, the initiator 22 is activated by a signal remotely generated by a crash sensor (not shown) for example. As shown in FIG. 2, the initiator 22 fires and ignites the monolithic propellant grain 26. As the grain 26 combusts and increases the pressure within the housing 12, the propellant cup 25 is ruptured at the second end 20 along a cruciform stress riser 32. Gas is then released through propellant cup petals 34 to activate the associated device, a pretensioner for example.

In sum, the invention can be characterized as a gas generator incorporating a monolithic gas generant composition containing silicone and at least one gas generant constituent resulting in a complete combustion system whereby the monolithic propellant is formed within the propellant cup 25. As such, the surface area is controlled and other benefits such as elimination of incidental noise due to loose propellant tablets, for example, are provided. In essence, by controlling the combustion surface area one can control the delivery rate of combustion gases to improve the performance of individual pretensioner drive designs. Finally, the present invention provides a simplified way of manufacturing a gas generator that is self-sufficient to activate any device connected thereto.

While specific embodiments have been described in detail, those of ordinary skill in the art will appreciate that various modifications and alternatives to those details could be developed in light of the overall teachings of the disclosure. For example, although ammonium perchlorate is a preferred oxidizer due to its gas generating ability and its propensity to be adsorbed in silicone, other gas generant constituents including fuels and/or oxidizers known for their use in vehicle occupant protection systems could also be "sprinkled" over the uncured silicone. These include but are not limited to the gas generant constituents disclosed in co-owned U.S. Pat. No. 5,035,757 (herein incorporated by reference). Therefore, fuels selected from the group of tetrazoles, triazoles, and metal and nonmetal salts thereof, and/or, oxidizers selected from the group consisting of metal and nonmetal nitrates, nitrites, perchlorates, and chlorates exemplify gas generant constituents contemplated.

Accordingly, the particular embodiments disclosed herein are meant to be illustrative only and not limiting as to the scope of the invention, which is to be given the full breadth of any claims which are derivable from the description herein, and any and all equivalents thereof.

We claim:

1. A gas generator for use in a vehicle occupant protection system comprising:
    a housing containing a first end and a second end, and an inner wall and an outer wall;
    a propellant cup defined by and within the inner wall at the second end of said housing;
    a monolithic gas generant composition formed within the propellant cup and in flush communication with the inner wall, wherein said gas generant composition comprises silicone and an oxidizer; and
    an initiator fixed within said first end and ignitably communicating with said monolithic gas generant composition for combustion thereof.

2. The gas generator of claim 1 wherein said monolithic gas generant composition comprises 15–30% by weight of silicone and 70–85% by weight of ammonium perchlorate.

3. The gas generator of claim 1 wherein said monolithic gas generant composition comprises 15–30% by weight of silicone and 70–85% by weight of potassium perchlorate.

4. The gas generator of claim 1 further comprising an autoignition material molded between the inner wall and the monolithic gas generant composition.

5. The gas generator of claim 1 wherein said gas generant composition comprises silicone, an oxidizer, and a fuel, said silicone comprising 15–30% by weight and said oxidizer comprising 70–85% by weight.

6. A gas generator for use in a vehicle occupant protection system comprising:
    a housing containing a first end and a second end, and an inner wall and an outer wall;
    a propellant cup defined by and within the inner wall at the second end of said housing;
    a monolithic gas generant composition formed within the propellant cup and in flush communication with the inner wall, wherein said gas generant composition comprises about 27% by weight of silicone and about 73% by weight of ammonium perchlorate; and
    an initiator fixed within said first end and ignitably communicating with said monolithic gas generant composition for combustion thereof.

7. A gas generator for use in a vehicle occupant protection system comprising:
    a housing containing a first end and a second end, and an inner wall and an outer wall;
    a propellant cup defined by and within the inner wall at the second end of said housing;
    a monolithic gas generant composition formed within the propellant cup and in flush communication with the inner wall, wherein said gas generant composition comprises 15–30% by weight of silicone and 70–85% by weight of an oxidizer; and
    an initiator fixed within said first end and ignitably communicating with said monolithic gas generant composition for combustion thereof.

8. The gas generator of claim 7 wherein said oxidizer is selected from the the group of metal and nonmetal nitrates, nitrites, perchlorates, chlorates, and mixtures thereof.

9. A method of assembling a gas generator for a vehicle occupant protection system wherein the gas generator has a propellant cup, the method comprising the steps of:

inserting uncured silicone into the propellant cup thereby establishing at least one surface area of the silicone;

sprinkling granulated oxidizer over the at least one surface area of the silicone to combine the uncured silicone and the granulated oxidizer; and curing the silicone combined with the at least one gas generant constituent and thereby forming a monolithic gas generant composition within the propellant cup.

10. The method of claim 9 further comprising the step of inserting a preform into the propellant cup for modifying the surface area prior to the curing step.

11. The method of claim 9 wherein the curing step is conducted at ambient temperature for at least twenty-four hours.

12. The method of claim 9 wherein the curing step is conducted at 65° C. for about four hours.

13. The method of claim 9 wherein the curing step is conducted at 150° C. for about fifteen minutes.

14. The method of claim 9 further comprising the step of adding a granulated fuel to the at least one surface area.

15. The method of claim 9 wherein the monolithic gas generant composition comprises 15–30% by weight silicone and 70–85% by weight of ammonium perchlorate.

16. A gas generator assembled by the method of claim 9.

* * * * *